US006605985B2

(12) United States Patent
Pagliato et al.

(10) Patent No.: US 6,605,985 B2
(45) Date of Patent: Aug. 12, 2003

(54) HIGH-EFFICIENCY POWER CHARGE PUMP SUPPLYING HIGH DC OUTPUT CURRENTS

(75) Inventors: Mauro Pagliato, Bollate (IT); Paolo Rolandi, Voghera (IT); Giorgio Oddone, Rossiglione (IT); Marco Fontana, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/162,135

(22) Filed: Jun. 3, 2002

(65) Prior Publication Data

US 2003/0034827 A1 Feb. 20, 2003

(30) Foreign Application Priority Data

Jun. 5, 2001 (IT) .......................... TO01A0537

(51) Int. Cl.[7] ................................. G05F 1/10
(52) U.S. Cl. ..................................... 327/536
(58) Field of Search ................. 327/530, 534, 327/535, 536, 537

(56) References Cited

U.S. PATENT DOCUMENTS 6,369,642 B1 * 4/2002 Zeng ........................... 327/536
6,496,055 B2 * 12/2002 Li ............................... 327/536

* cited by examiner

Primary Examiner—Jeffrey Zweizig
(74) Attorney, Agent, or Firm—Lisa K. Jorgenson; Harold H. Bennett, II; Seed IP Law Group PLLC

(57) ABSTRACT

The voltage applied to the gate terminals of the charging transistors and charge-transfer transistors of two parallel pumping branches forming a charge pump is a boosted voltage generated internally and supplied in a crosswise manner. In particular, for driving the charge pump, first and second driving signals are generated respectively for the first and for the second pumping branch via a first and respectively a second driving circuit; the first and second driving signals are also supplied respectively to a first and to a second auxiliary charge pump to obtain respectively first and second voltage-boosted signals; and the first and second boosted voltages are respectively supplied to the second and to the first driving circuit.

12 Claims, 6 Drawing Sheets

HIGH-EFFICIENCY POWER CHARGE PUMP SUPPLYING HIGH DC OUTPUT CURRENTS

BACKGROUND OF THE INVENTION

1. Field of the Invention

The present invention relates to a power charge pump for low supply voltage applications, which is able to supply high DC output currents.

2. Description of the Related Art

Pumps of the above type find a typical application in nonvolatile memories, such as EPROM and flash memories, wherein parallel writing of the cells is envisaged, parallel writing requiring output currents of the order of tenths of mA to meet the ever more demanding speed requirements.

In particular, for this type of memories, it is often required to supply internally the writing voltage of 4.5 V, to be applied to the drain terminals of the cells, without having to supply it from outside. A further requirement is to avoid the use of large capacitive structures outside the auxiliary chip or chips, such as a DC/DC converter.

The basic diagram of a generic known charge pump is shown in FIG. 1, wherein a charge pump 1 is formed by a first and a second branch 2s, 2d, parallel to one another and including a single stage, and by a phase-generating stage 7.

The two branches 2s, 2d have the same structure. In addition, the phase-generating stage 7 is formed by two symmetrical parts which supply phase signals φ and φN for the first and for the second branch 2s, 2d. Consequently, the corresponding components are designated by the same reference numbers and by a letter s or d according to whether they refer to the first branch 2s or to the second branch 2d.

In detail, each branch 2s, 2d comprises a first switch and a second switch which are connected at an intermediate node 5s, resp. 5d, and are implemented by a charging transistor 3s, resp. 3d, and a charge-transfer transistor of NMOS type 4s, resp. 4d. In particular, the drain terminals of the charging transistors 3s, 3d are connected to a supply line 10 feeding a supply voltage $V_{DD}$. The source terminal of the charging transistor 3s, resp. 3d, is connected to the intermediate node 5s, resp. 5d, and the gate terminal of the charging transistor 3s, resp. 3d, receives a respective control signal V1s, V1d. In addition, the drain terminal of the charge-transfer transistor 4s, resp. 4d, is connected to the intermediate node 5s, resp. 5d. In addition, the drain terminal of the charge-transfer transistor 4s, resp. 4d, is connected to the intermediate node 5s, resp. 5d. Both source terminals of the charge-transfer transistors 4s, 4d are connected to an output node 11, and the gate terminal of the charge-transfer transistor 4s, resp. 4d, receives a respective control signal V2s, V2d.

Each branch 2s, 2d further comprises a boosting capacitor 12s, resp. 12d, which has a first terminal connected to the intermediate node 5s, resp. 5d, and a second terminal connected to an output node 14s, resp. 14d, of a first 13s, resp. a second inverter 13d.

The inverters 13s, resp. 13d, belong to the phase-generating stage 7 and each comprise a PMOS transistor 19s, resp. 19d, and an NMOS transistor 20s, resp. 20d, connected together in series between the supply line 10 and the ground line 15. The inverters 13s, resp. 13d, have a respective input 16s, 16d which receives a respective oscillating signal F, FN, generated by an oscillator 18. The oscillating signals F, FN are in phase opposition and oscillate between the supply voltage $V_{DD}$ and 0 V. Phase signals φ and φN, in phase opposition to each other, are thus present on the outputs 14s, resp. 14d.

Boosted voltages Vs, resp. Vd are present on the intermediate nodes 5s, 5d; the output node 11, at an output voltage Vout, supplies a current Iout.

Operation of the charge pump 1 will now be described with reference to the first branch 2s; the second branch 2d behaves in the same way, but is out of phase by T/2, where T is the period of the oscillator 18.

When the oscillating signal F coming from the oscillator 18 switches to the high state ($V_{DD}$), the output 14s of the first inverter 13s is at 0 V, and the boosting capacitor 12s charges up to the supply voltage $V_{DD}$ through the charging transistor 3s, which is on. When the oscillating signal F switches to 0 V, the output 14s of the first inverter 13s is high ($V_{DD}$), the charging transistor 3s is off, and the voltage Vs tends to go to $2V_{DD}$. In addition, the charge-transfer transistor 4s is on and transfers the boosted voltage Vs to the output 11.

The operation described above is, however, correct only when the charge pump is not required to supply DC current at output. In fact, the maximum output voltage of the charge pump 1 is different according to whether a capacitive load or an ideal DC generator is connected to the output 11. In fact, in case of a capacitive load, the charge pump 1 must supply current only in the charging transient of the output capacitor, and subsequently must only supply a minimal current in order to compensate any losses. In this case, the current that can be supplied by the charge pump 1 affects only the rapidity of the transient, but does not affect the voltage Vout that may be obtained at output under steady-state conditions. This situation typically occurs when the charge pump 1 is used for driving in parallel the gate terminals of memory cells.

If, instead, the load requires DC current, as when the drain terminals of the memory cells are to be biased during writing, it is necessary to consider the voltage drops $\Delta V_{MP}$, $\Delta VC$ and $\Delta V_{M4}$ across the PMOS transistors 19s, 19d, the boosting capacitors 12s, 12d, and the charge-transfer transistors 4s, 4d, and are due to passage of current in these components.

The output voltage Vout alternately follows the trend of the boosted voltages Vs, Vd minus the drops across the charge-transfer transistors 4s, 4d. The obtainable overall waveform of the output voltage Vout, considering the voltage drops mentioned, is illustrated in FIG. 2, which shows both the reduction in the maximum value due to the voltage drops $\Delta V_{MP}$ and $\Delta V_{M4}$ and the ripple that is due to the boosting capacitors 12s, 12d, the value of which depends upon the sizing of the boosting capacitors 12s, 12d.

In particular, hereinafter the impact of the circuit parameters and characteristics of the charge pump 1 on the voltage drops $\Delta V_{MP}$, $\Delta VC$ and $\Delta V_{M4}$ is evaluated. Also in this case, reference will be made to the PMOS transistor 19s, the charge-transfer transistor 4s and the boosting capacitor 12s of the first branch, and the ensuing description also applies to the second branch 2d.

Calculation of $\Delta V_{MP}$

When the oscillating signal F is low (0 V), the PMOS transistor 19s is on. On the assumption that across the PMOS transistor 19s there is a voltage drop $\Delta V_{MP}$ having a low value, the PMOS transistor 19s works in the ohmic region. Consequently, the current Iout that flows in the PMOS transistor 19s, and then in the boosting capacitor 12s, in the charge-transfer transistor 4s and then to the output 11 can be expressed, to a first approximation, as $$Iout = \mu_P \frac{W_P}{L_P} C_{ox}(V_{DD} - |V_{thP}|)\Delta V_{MP}$$

where $\mu_P$ is the electronic mobility, $C_{ox}$ is the capacitance of the gate oxide, $W_P/L_P$ is the aspect ratio, and $V_{thP}$ is the threshold voltage of the PMOS transistor 19s. We thus obtain $$\Delta V_{MP} = \frac{Iout}{\mu_P \frac{W_P}{L_P} C_{ox}(V_{DD} - |V_{thP}|)}$$

The electronic mobility and the capacitance of the oxide are preset process parameters. The designer can therefore act only on the sizing of the aspect ratio.

Calculation of $\Delta V_C$

The voltage drop $\Delta V_C$ on the boosting capacitor 12s is linked to the oscillation half-period $\Delta T$ according to the following relation:

$$Iout = C \frac{\Delta V_C}{\Delta T} = C \Delta V_C 2 f_{osc}$$

wherein $f_{osc} = 1/\Delta T$ is the oscillation frequency of the oscillator 18, and C is the capacitance of the boosting capacitor 12s. We thus have $$\Delta V_C = \frac{Iout}{2 f_{osc} C}$$

In order to reduce the above potential difference, it is possible to act only on the oscillation frequency $f_{osc}$ and on the capacitance C.

Calculation of $\Delta V_{M4}$

Analogously to what has been described for PMOS transistor 19a, the voltage on the charge-transfer transistor 4s is $$\Delta V_{M4} = \frac{Iout}{\mu_N \frac{W_N}{L_N} C_{ox}(V_{2s} - Vout - V_{thN})}$$

where $\mu_N$ is the electronic mobility of N-type dopant, $C_{ox}$ is the capacitance of the gate oxide, $W_N/L_N$ is the aspect ratio, and $V_{thN}$ is the threshold voltage of the charge-transfer transistor 4s.

In this case, in addition to the possibility of acting on the aspect ratio, it is also possible to act on the voltage V2s applied to the gate terminal of the charge-transfer transistor 4s.

In particular, if the charge-transfer transistors 4s, 4d (as for the charging transistors 3s, 3d) are driven by switches connecting their drain terminals with the respective gate terminals during conduction, and are thus diode-connected, they have a high voltage drop due to the body effect, with a consequent considerable reduction in the efficiency of the charge pump 1.

In order to eliminate the problem of the body effect, charge pumps are known, referred to as "cross pumps," which use four different phases for driving the charging transistors 3s, 3d and the charge-transfer transistors 4s, 4d. A simplified diagram of a charge pump 28 of the "cross pump" type is shown in FIG. 3 and will be briefly described hereinafter.

The charge pump 28 has a basic structure similar to that of the known charge pump of FIG. 1. The components in common with those of the known charge pump of FIG. 1 are therefore designated by the same reference numbers. In FIG. 3, however, the phase-generating stage is not shown, while the driving circuits are shown.

In particular, the charge pump 28 comprise a first and a second branch 2s, 2d, and a first and a second driving circuit 24s, 24d. Each branch 2s, 2d includes a charging transistor 3s, resp. 3d, a charge-transfer node 4s, resp. 4d, and a boosting capacitor 12s, resp. 12d. Each driving circuit 24s, resp. 24d, comprises a first driving transistor 21s, resp. 21d, a second driving transistor 22s, resp. 22d, a third driving transistor 27s, resp. 27d, a first driving capacitor 23s, resp. 23d, a second driving capacitor 25s, resp. 25d, and a third driving capacitor 26s, resp. 26d. The transistors are all of NMOS type.

In detail, the first driving transistor 21s, resp. 21d, has its drain terminal connected to the drain terminal of the charging transistor 3s, resp. 3d, its gate terminal connected to the intermediate node 5s, resp. 5d, and its source terminal connected to a first terminal of the first driving capacitor 23s, resp. 23d, as well as to the gate terminal of the charging transistor 3s, resp. 3d. The second terminal of the first driving capacitor 23s, resp. 23d, receives a first phase signal A2 and, respectively, a second phase signal B2. The boosting capacitor 12s, resp. 12d, has a first terminal connected to the intermediate node 5s, resp. 5d (as for the charge pump of FIG. 1) and a second terminal receiving a third phase signal B1 and, respectively, a fourth phase signal A1.

The second driving transistor 22s, resp. 22d, has its drain terminal connected to the intermediate node 5s, resp. 5d, its gate terminal connected to a source terminal of the third driving transistor 27s, resp. 27d and to a first terminal of the third driving capacitor 26s, resp. 26d, and its source terminal connected to a first terminal of the second driving capacitor 25s, resp. 25d, to the gate terminal of the charge-transfer transistor 4s, resp. 4d, as well as to the gate terminal of the third driving transistor 27s, resp. 27d. A drain terminal of the third driving transistor 27s, resp. 27d, is connected to the intermediate node 5s, resp. 5d. The second terminal of the second driving capacitor 25s, resp. 25d, receives the second phase signal B2 and, respectively, the first phase signal A2. The second terminal of the third driving capacitor 26s, resp. 26d, receives the fourth phase signal A1 and, respectively, the third phase signal B1.

In the charge pump of FIG. 3, as shown by the waveforms of the phase signals A1, A2, B1, B2 of FIG. 4, charging of the boosting capacitor 12s, resp. 12d, and transfer of charge from the boosting capacitor 12s, resp. 12d, to the output node 11 do not take place for the entire respective half-period. For example, in the charge-transfer step of the first branch 2s, initially (instant t0) the boosting capacitor 12s is brought in a "ready-for-transfer" condition by the third phase signal B1 switching to the high state. Then (instant t1), the fourth phase signal A1 switches to low, turning off the second driving transistor 22s and isolating the gate terminal of the charge-transfer transistor 4s from the intermediate node 5s. Only subsequently (instant t2), the second phase signal B2 switches to high, turning on completely the charge-transfer transistor 4s and enabling connection of the boosting capacitor 12s to the output node 11. Next, as soon as the second phase signal B2 switches again to low (instant t3) transfer of charge by the first branch 2b terminates.

Also transfer of charge from the boosting capacitor 12d of the second branch 2d to the output node 11 does not take place immediately thereafter. In fact, switching to high of the fourth phase signal A1, which brings the boosting capacitor 12d in the "ready-for-transfer" condition, occurs with a delay with respect to switching to low of the second phase signal B2 (instant t4) and, with a succession of steps that is similar to the one described above, connection of the boosting capacitor 12d of the second branch 2d to the output node 11 takes place only subsequently (instant t5). In practice, the time interval t0–t2 represents the dead time between start of the charge-transfer half-period and start of charge transfer proper. The time interval t3–t4 represents the dead time between end of charge transfer and start of the charging step. Altogether, the output 11 sees a dead time wherein neither the branch 2s nor the branch 2d transfers any charge outwards, and which corresponds to the time interval t3–t5.

The four-phase charge pump 28 is therefore far from efficient, in particular in the case of a high oscillation frequency, wherein the precharging time becomes comparable with the effective pumping time. Furthermore, it is complex and requires a large area for accommodating the circuits for generating the four-phase signals.

BRIEF SUMMARY OF THE INVENTION

An embodiment of the present invention provides a charge pump that is free from the drawbacks described above.

According to the present invention there is provided a power charge pump, operating as follows:

Voltage applied to gate terminals of charging transistors and charge-transfer transistors of two parallel pumping branches forming the charge pump is a boosted voltage generated internally and supplied in a crosswise manner. In particular, for driving the charge pump, first and second driving signals are generated respectively for the first and for the second pumping branch via a first and respectively a second driving circuit; the first and second driving signals are also supplied respectively to a first and to a second auxiliary charge pump to obtain respectively first and second voltage-boosted signals; and the first and second boosted voltages are respectively supplied to the second and to the first driving circuit.

According to an aspect of the invention, the voltage applied to the gate terminals of the charging transistors and of the charge-transfer transistors is a boosted voltage generated internally and supplied in a crosswise manner.

According to another aspect of the invention, in a charge pump comprising a first pumping branch and a second pumping branch, which are connected in parallel between a supply node and an output node, the following steps are performed: generating first driving signals and second driving signals respectively for the first pumping branch and for the second pumping branch through a first driving circuit and a second driving circuit, respectively; providing a first auxiliary charge pump and a second auxiliary charge pump; supplying the first driving signals and the second driving signals respectively to the first auxiliary charge pump and to the second auxiliary charge pump to obtain first voltage-boosted signals and second voltage-boosted signals, respectively; and supplying the first voltage-boosted signals and the second voltage-boosted signals to the second driving circuit and to the first driving circuit, respectively.

BRIEF DESCRIPTION OF THE SEVERAL VIEWS OF THE DRAWING(S)

In order to provide a better understanding of the present invention, some embodiments thereof will now be described, purely as non-limiting example, with reference to the attached drawings, wherein.

DETAILED DESCRIPTION OF THE INVENTION

Figure 1:
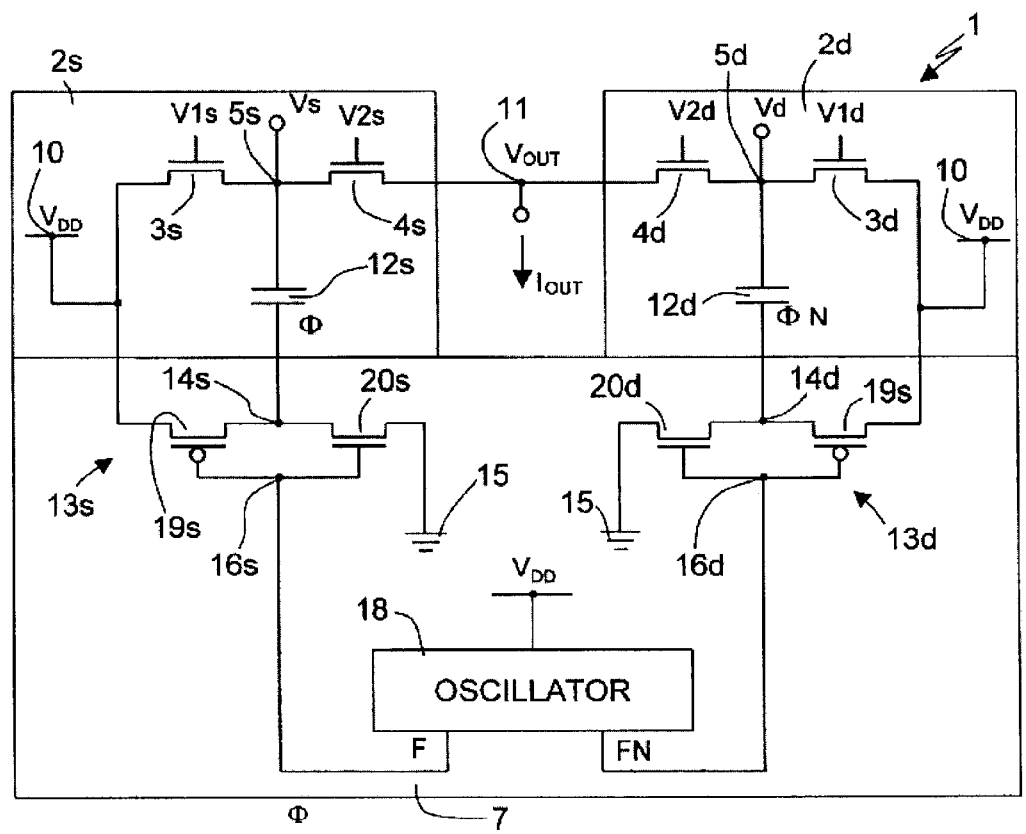
FIG. 1 illustrates a circuit diagram of a known charge pump.
Figure 5:
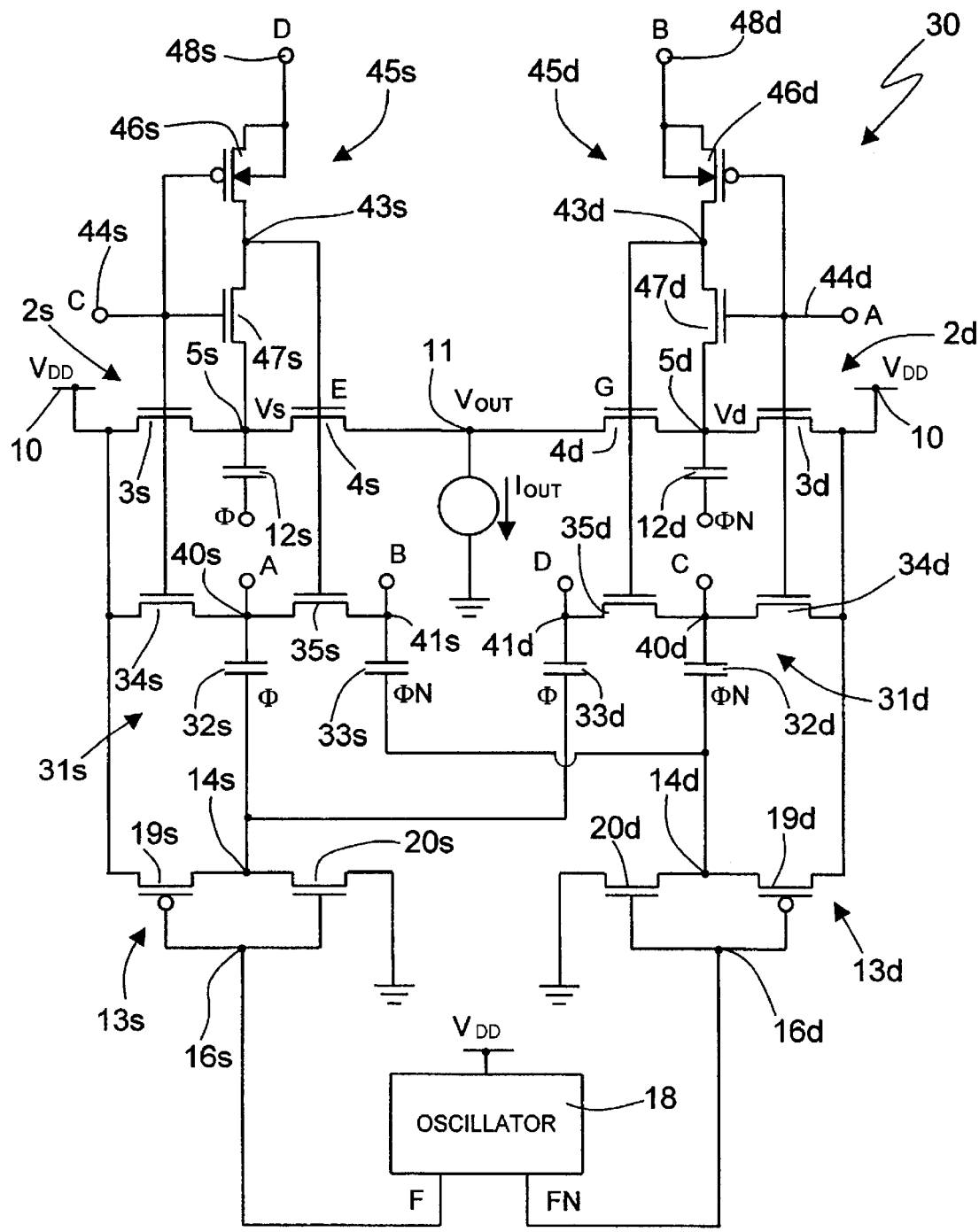
FIG. 5 shows a simplified circuit diagram of a first embodiment of the charge pump according to the invention.

As shown in FIG. 5, a charge pump 30 according to the invention has a basic structure similar to that of the charge pump 1 of FIG. 1. The components that are in common with those of the charge pump of FIG. 1 are therefore designated by the same reference numbers.

Figure 2:
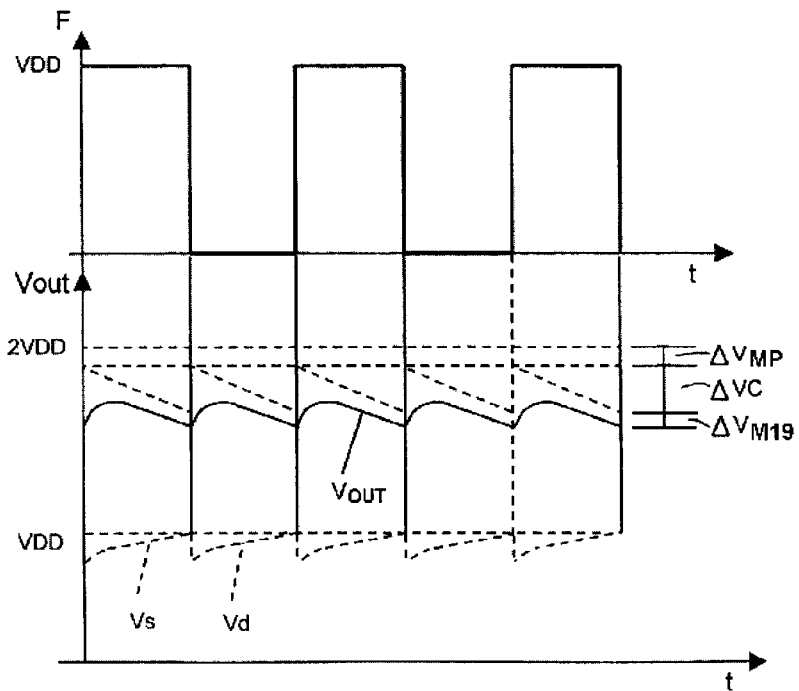
FIG. 2 shows the waveforms of the signals used in the known charge pump of FIG. 1.
Figure 3:
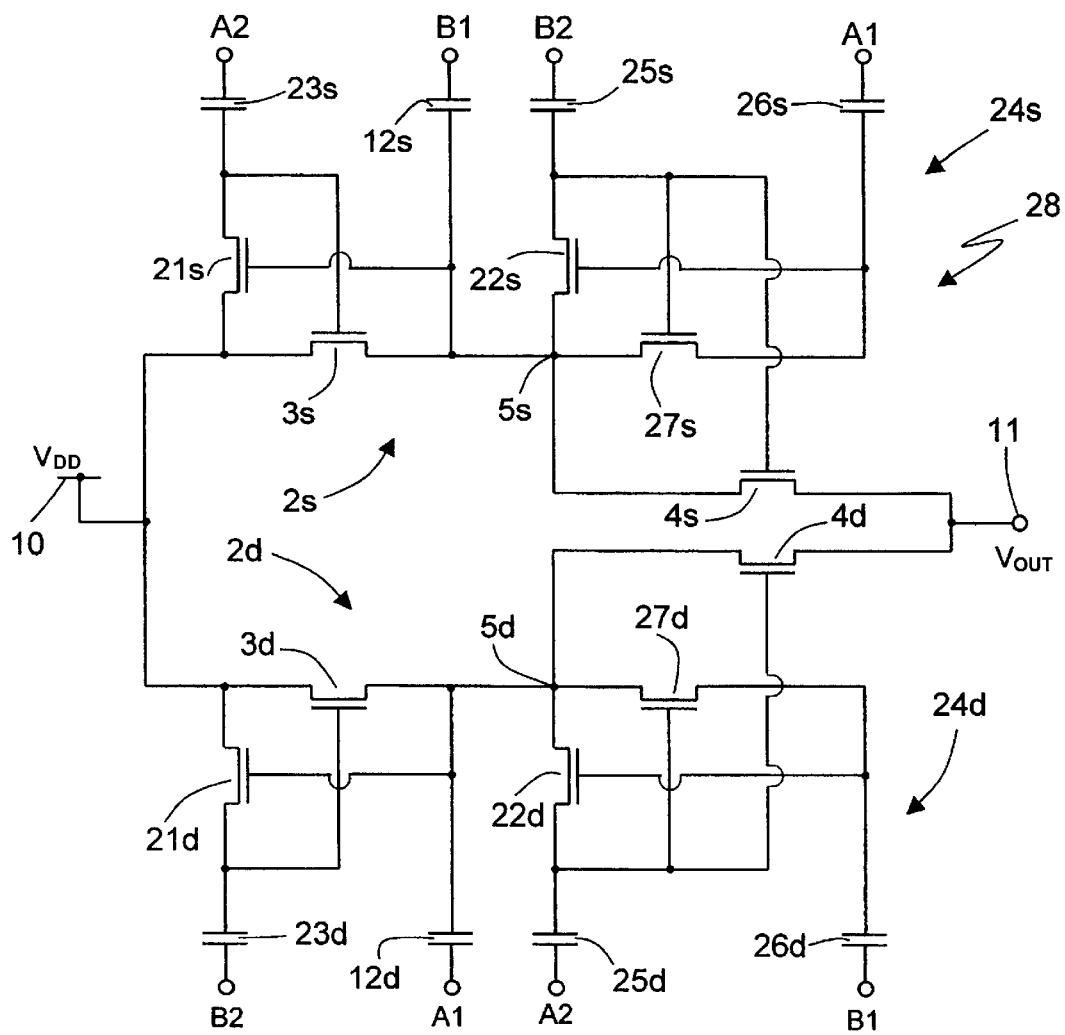
FIG. 3 shows a circuit diagram of another known charge pump.
Figure 4:
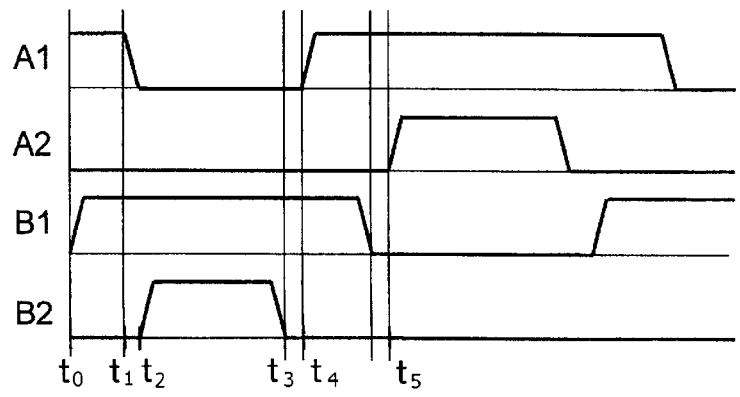
FIG. 4 shows the waveforms of the phase signals used for the charge pump of FIG. 3.

In particular, the charge pump 30 comprises a first and a second branch 2s, 2d, each including a charging transistor 3s, resp. 3d, a charge-transfer transistor 4s, resp. 4d, and a boosting capacitor 12s, resp. 12d. An oscillator 18 generates oscillating signals F, FN, which are in phase opposition and have a period T, that are supplied respectively to a first inverter 13s and to a second inverter 13d. The outputs 14s, resp. 14d, of the inverters 13s, resp. 13d, supply the phase signals φ and φN, respectively, as for the charge pump of FIG. 2.

The charge pump 30 moreover comprises a first and a second auxiliary pump 31s, 31d, which are identical to one another, are dual-stage pumps and are driven in phase opposition.

In detail, the first auxiliary pump 31s comprises a first and a second auxiliary capacitor 32s, 33s, and a first and a second auxiliary switch which are respectively formed by a first and a second auxiliary transistor 34s, 35s.

The first auxiliary capacitor 32s of the first auxiliary pump 31s is connected, at a first terminal, to the output 14s of the first inverter 13s (from which it receives the phase signal φ) and, at a second terminal, to a first boosting node 40s, which supplies a first driving voltage A. The second auxiliary capacitor 33s of the first auxiliary pump 31s is connected, at a first terminal, to the output 14d of the second inverter 13d (from which it receives the phase signal φN) and, at a second terminal, to a second boosting node 41s, which supplies a second driving voltage B.

The first auxiliary transistor 34s of the first auxiliary pump 31s has its drain terminal connected to the supply line 10, its source terminal connected to the first boosting node 40s, and its gate terminal connected to a first driving node 44s. The second auxiliary transistor 35s has its drain terminal connected to the first boosting node 40s, its source terminal connected to the second boosting node 41s, and its gate terminal connected to a second driving node 43s.

Likewise, the second auxiliary pump 31d comprises a third and a fourth auxiliary capacitor 32d, 33d, and a third and a fourth auxiliary switch which are respectively formed by a third and a fourth auxiliary transistor 34d, 35d.

The third auxiliary capacitor 32d is connected between the output 14d of the second inverter 13d and a third boosting node 40d, which supplies a third driving voltage C. The fourth auxiliary capacitor 33d is connected between the output 14s of the first inverter 13s and a fourth boosting node 41d, which supplies a fourth driving voltage D.

The third auxiliary transistor 34d is connected between the supply line 10 and the third boosting node 40d and has its gate terminal connected to a third driving node 44d. The fourth auxiliary transistor 35d is connected between the third boosting node 40d and the fourth boosting node 41d and has its gate terminal connected to a fourth driving node 43d.

The charge pump 30 further comprises a first and a second driving circuit, each of which is formed by an inverting circuit 45s, 45d. The first inverting circuit 45s comprises a first driving transistor 46s, of PMOS type, and a second driving transistor 47s, of NMOS type. The second inverting circuit 45d comprises a third driving transistor 46d, of PMOS type, and a fourth driving transistor 47d, of NMOS type.

The first driving transistor 46s has its source terminal 48s connected to the fourth boosting node 41d and receiving the fourth driving signal D, its gate terminal connected to the first driving node 44s, in turn connected to the boosting node 40d and thus receiving the third driving signal C, and its drain terminal connected to the second driving node 43s and supplying a fifth driving signal E.

The second driving transistor 47s has its drain terminal connected to the second driving node 43s, its gate terminal connected to the first driving node 44s, and its source terminal connected to the first intermediate node 5s.

The third driving transistor 46d has its source terminal 48d connected to the second boosting node 41s and receiving the second driving signal B, its gate terminal connected to the third driving node 44d, which is in turn connected to the first boosting node 40s and hence receives the first driving signal A; and its drain terminal connected to the fourth driving node 43d and supplying a sixth driving signal G.

The fourth driving transistor 47d has its drain terminal connected to the fourth driving node 43d, its gate terminal connected to the third driving node 44d, and its source terminal connected to the second intermediate node 5d.

Finally, the gate terminal of the first charging transistor 3s is connected to the first driving node 44s and receives the third driving signal C. The gate terminal of the second charging transistor 3d is connected to the third driving node 44d and receives the first driving signal A. The gate terminal of the first charge-transfer transistor 4s is connected to the second driving node 43s and receives the fifth driving signal E. The gate terminal of the second charge-transfer transistor 4d is connected to the fourth driving node 43d and receives the sixth driving signal G.

The auxiliary capacitors 32s, 32d, 33s, 33d are of a much smaller size, by one or two orders of magnitude, than the boosting capacitors 12s, 12d, which are power capacitors. For example, if an output current Iout of 2–4 mA is to be supplied outwards, with an output voltage Vout=4.5 V, a supply voltage $V_{DD}$=2.7 V, and an oscillation frequency of 30 MHz, the boosting capacitors 12s, 12d may have capacitances of 70–100 pF, and the auxiliary capacitors 32s, 32d, 33s, 33d may have capacitances of 2–3 pF.

Figure 6:
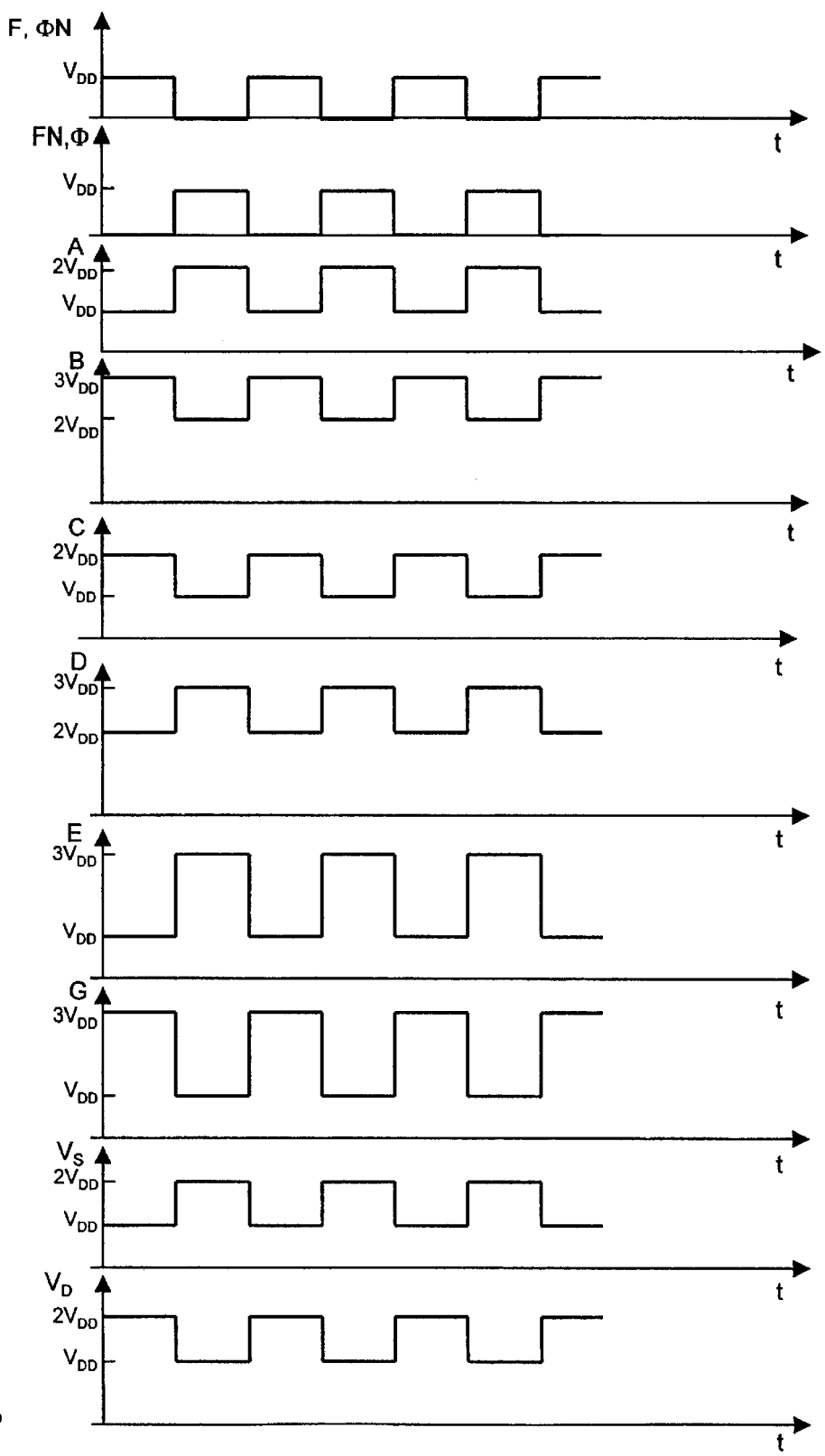
FIG. 6 shows the waveforms of the signals used in the charge pump of FIG. 5.

Hereinafter, operation of the charge pump 30 will be described in a steady-state condition, after the charging capacitors 12s, 12d have charged. The waveforms of the signals in the charge pump 30 are illustrated in FIG. 6.

When the oscillating signal F and the phase signal φN are high and the oscillating signal FN and the phase signal φ are low, the first branch 2s is in a charging state and the second branch 2d is in a charge-transfer state. In this situation, as will be clarified hereinafter, the first driving signal A is at $V_{DD}$, the second driving signal B is at $3V_{DD}$, the third driving signal C and the fourth driving signal D are at $2V_{DD}$, the fifth driving signal E is at $V_{DD}$, and the sixth driving signal G is at $3V_{DD}$.

Consequently, the first auxiliary transistor 34s is on, connecting the first boosting node 40s to the supply line 10 and bringing the first driving signal A at $V_{DD}$, as mentioned above. In addition, the first charging transistor 3s is also on, and the boosted voltage Vs on the intermediate node 5s is at $V_{DD}$. The first driving transistor 46s is off (it has its drain terminal and source terminal at the same voltage $V_{DD}$), and the second driving transistor 47s is on. Consequently, the latter transistor keeps the fifth driving signal E at $V_{DD}$ and connects the source and gate terminals of the first charge-transfer transistor 4s, which is thus off and prevents passage of current from the output node 11 to the first intermediate node 5s. In addition, also the second boosting transistor 35s is off, in so far as it has its gate and source terminals at the same voltage, and the second driving signal B can go to $3V_{DD}$.

Instead, the third boosting transistor 34d and the second charging transistor 3d are off (they have their gate and source terminals at the same voltage), thus enabling boosting of the third driving signal C and of the second boosted voltage Vd to $2V_{DD}$. The third driving transistor 46d is on (the second driving signal B is at $3V_{DD}$, and the first driving signal A is at $V_{DD}$), while the fourth driving transistor 47d is off (in so far as it has its gate terminal at a lower voltage than its source terminal). Consequently, the sixth driving signal G is at $3V_{DD}$ and keeps the fourth boosting transistor 35d and the second charge-transfer transistor 4d on.

The fourth boosting transistor 35d thus enables transfer of charge from the third auxiliary capacitor 32d to the fourth auxiliary capacitor 33d, which is thus charged to $2V_{DD}$. Likewise, the second charge-transfer transistor 4d transfers the charge stored in the previous step to the output node 11.

In the next half-period, the oscillating signal F and the phase signal φN are low; the oscillating signal FN and the phase signal φ are high. In this situation, the first driving signal A is at $2V_{DD}$, the second driving signal B is at $2V_{DD}$, the third driving signal C is at $V_{DD}$, the fourth driving signal D is at $3V_{DD}$, the fifth driving signal E is at $3V_{DD}$, and the sixth driving signal G is at $V_{DD}$. Consequently, the behavior of the components of the first branch 2s and second branch 2d, of the auxiliary pumps 31s, 31d, and of the first inverting circuit 45s and second inverting circuit 45d is dual with respect to what has been described previously: the first branch 2s is in a charge-transfer state and supplies current to the output node 11, while the second branch 2d is in a charging state.

The charge pump 30 affords the following advantages. First, as compared to diode charge pumps, the pump 30 has no drops due to body effect, since the charging transistors 3s, 3d and the charge-transfer transistors 4s, 4d are turned on by driving voltages higher than the voltages on the respective drain terminals. Thanks to the use of just two phases, the circuit is simple, is less bulky than the "cross pump," and enables saving also in terms of energy as regards the driving stages. In addition, given the same size of the components and the same frequency of oscillation, the charge pump described herein has a longer active pumping step. In fact, there do not exist any dead times for pre-charging of the boosting capacitors during which neither of the two branches 2s, 2d supplies current at output. This makes it possible to diminish the ripple on the output voltage in conditions of DC supply in so far as there always exists a boosting phase at the output. Furthermore, the efficiency of the charge pump 30 is greater than the efficiency of known charge pumps.

In fact, representing schematically the charge pump 30 as a circuit block that absorbs a current Iin from a voltage source Vin and supplies an output current Iout at voltage Vout, the power efficiency $\eta_P$ may be expressed as the ratio between the power supplied Pout and the power absorbed Pin $$\eta_P = \frac{Pout}{Pin} 100$$

where Pout=Vout*Iout, and Pin=Vin*Iin. In the ideal case wherein efficiency is 100% and wherein an output voltage Vout=2Vin is desired, it follows that Iout=Iin/2. In this case, efficiency in terms of current defined as $$\eta_I = \frac{Iout}{Iin} 100$$

is 50%. A complete way of evaluating the efficiency of the entire pump consists in summing up, within the term Iin, all the input current contributions, including the current absorbed by the oscillator 18.

By way of example, if it is desired to design a power charge pump supplied by a low supply voltage ($V_{DD}$=2.7 V), which is able to supply a maximum output current of 4 mA at an output voltage Vout=4.5 V, using a 18–25 MHz oscillator, the boosting capacitors must be at least 60 pF each. According to the above assumptions, current efficiency $\eta_I$ is close to 40%. This high level of efficiency is a result, on one hand, of the simplicity of the two-phase circuit, which does not require any further control structures, and, on the other hand, of the fact that, during turning-off of the switches 3s, 3d, 4s, 4d, the charge that is displaced from their gate regions is not lost to ground, but contributes to re-charging the capacitive structures connected thereto.

Figure 7:
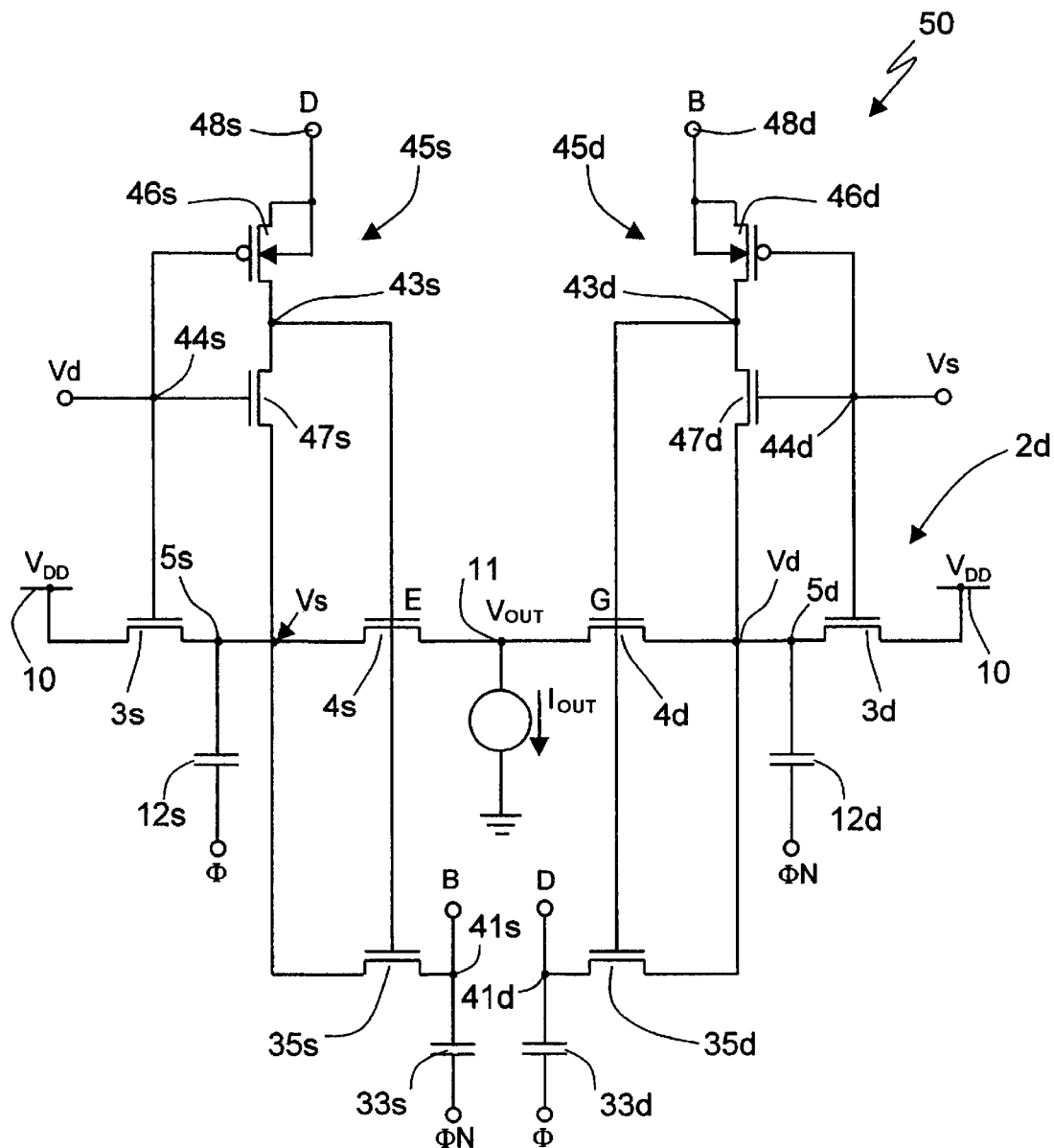
FIG. 7 shows a simplified circuit diagram of a second embodiment of the charge pump according to the invention.

FIG. 7 shows a charge pump 50, which represents a simplified version of the charge pump 30 of FIG. 5. In practice, the charge pump 50 of FIG. 7 differs from the charge pump 30 of FIG. 5 in that it does not comprise the first and the third auxiliary capacitor 32s, 32d, and the first and the third auxiliary transistor 34s, 34d. In addition, the drain terminals of the second auxiliary capacitor 35s and of the fourth auxiliary capacitor 35d are respectively connected to the intermediate node 5s, resp. 5d to enable charging of the second auxiliary capacitor 33s and of the fourth auxiliary capacitor 33d, respectively, during the charge-transfer step of the respective branch 2s, 2d. It moreover follows that the first and second inverting circuit 45s, 45d receive respectively the boosted voltage Vd and the boosted voltage Vs. Otherwise, the charge pump 50 of FIG. 7 is identical to the charge pump 30 of FIG. 5.

Operation of the charge pump 50 is described hereinafter. When the phase signal ϕ is low and the phase signal ϕN is high, the boosting capacitor 12s is in the charging step through the first charging transistor 3s (the boosted voltage Vd on the first driving node 44s is at $2V_{DD}$, since the boosting capacitor 12d is in the charge-transfer step). The phase signal B is high (at $3V_{DD}$) and the phase signal D is low (at $2V_{DD}$). Consequently, the second driving transistor 47s is on, and the charge-transfer transistor 4s of the first branch 2s is off (as is also the third auxiliary transistor 35s). Instead, the charging transistor 3d of the second branch 2d is off (the boosted voltage Vs on the third driving node 44d is at $V_{DD}$), the third driving transistor 46d is on, and the charge-transfer transistor 4d is on, thus enabling charge transfer from the boosting capacitor 12d to the output 11. Furthermore, the fourth auxiliary transistor 35d is on and enables restoration of the charge of the fourth auxiliary capacitor 33d by the boosting transistor 12d of the second branch 2d. When the signals ϕ and ϕN switch, the behavior is reversed.

The charge pump 50 is advantageously used in low-power conditions, when no high output current is required, in so far as the charge of the boosting capacitor 12s, 12d is in part also transferred respectively to the second auxiliary capacitor 33s and to the fourth auxiliary capacitor 33d for generating the second phase signal B and the fourth phase signal D.

Figure 8:
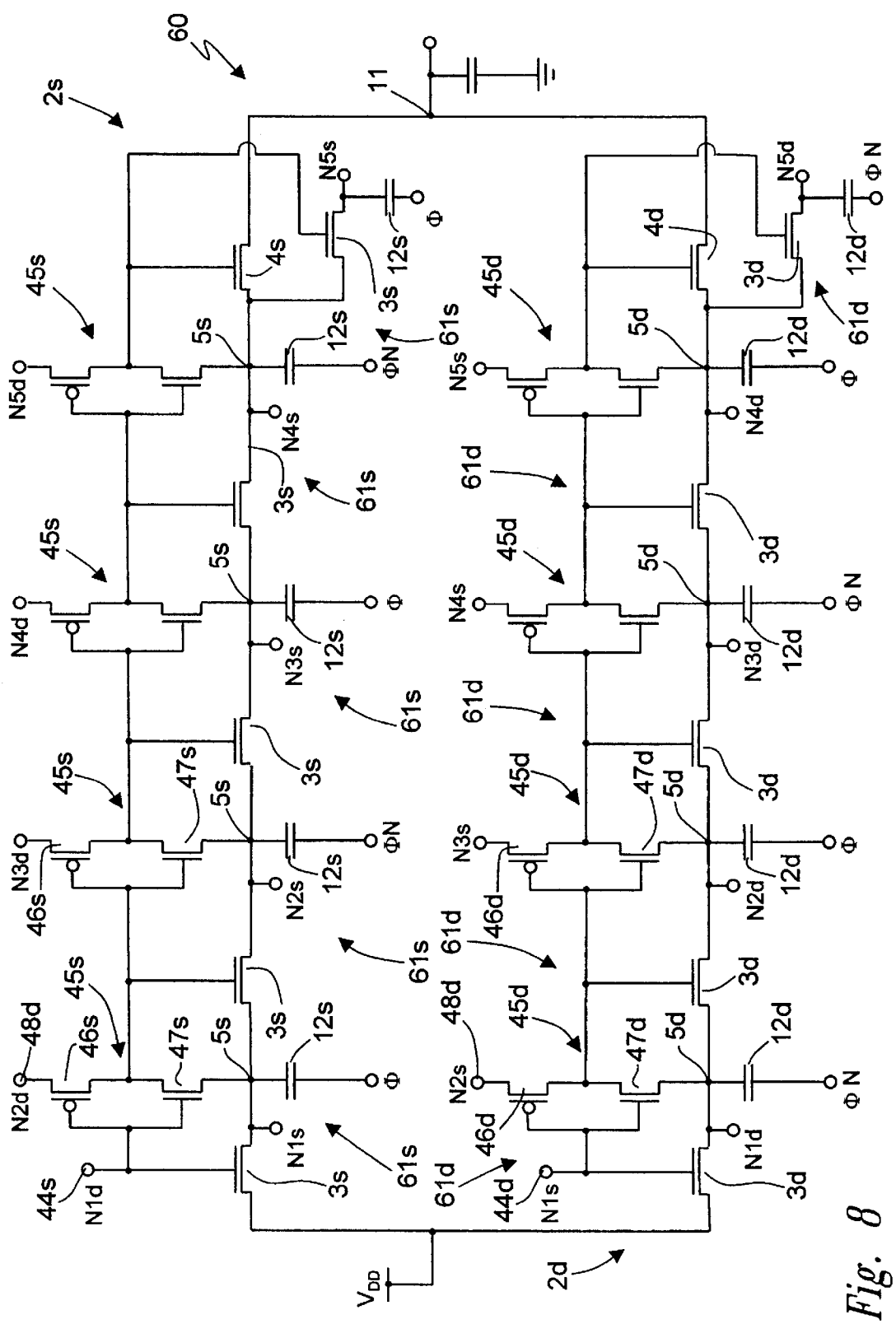
FIG. 8 shows a simplified circuit diagram of a third embodiment of the charge pump according to the invention.

FIG. 8 shows a third embodiment of the charge pump according to the invention, wherein a plurality of cascaded stages are provided for generating an output voltage higher than $2V_{DD}$.

In detail, a charge pump 60 comprises a first and a second branch 2s, 2d, respectively formed by five first stages 61s, which are cascaded together, and five second stages 61d, which are cascaded together. Each stage 61s, 61d comprises a charging transistor 3s, resp. 3d, a boosting capacitor 12s, resp. 12d, and an inverting circuit 45s, resp. 45d, except for the first stage of each branch 2s, 2d, which is driven directly by the driving signals supplied by the opposite branch, as explained hereinafter. The boosting capacitor 12s, 12d of each stage 61s, resp. 61d, of the first branch 2s and of the second branch 2d, is driven by a phase signal ϕ, ϕN, respectively, which is opposite to the immediately preceding stage of the same branch 2s, 2d and to the corresponding stage 61d, resp. 61s, of the opposite branch 2d, resp. 2s.

The source terminal of each charging transistor 3s is connected to the respective boosting capacitor 12s and to the drain terminal of the charging transistor 3s of the next stage in an intermediate node 5s, which supplies a voltage N1s, N2s, . . . , N5s. Likewise, the source terminal of each charging transistor 3d is connected to the respective boosting capacitor 12d and to the drain terminal of the charging transistor 3d of the next stage in an intermediate node 5d, which supplies a driving voltage N1d, N2d, . . . , N5d.

The driving voltage N1s of the first stage 61s of the first branch 2s is supplied to the gate terminal of the charging transistor 3d of the first stage 61d and to the input of the inverting circuit 45d of the second stage 61d of the second branch 2d. Likewise, the driving voltage N1d of the first stage 61d of the second branch 2d is supplied to the gate terminal of the charging transistor 3s of the first stage 61s and to the input of the inverting circuit 45s of the first stage 61s of the first branch 2s. The driving voltages N2s, . . . , N5s are supplied to the source terminal of the third driving transistor 46d of the corresponding stage 61d of the second branch 2d. Likewise, the driving voltages N2d, . . . , N5d are supplied to the source terminal of the first driving transistor 46s of the corresponding stage 61s of the first branch 2s. The output of each inverting circuit 45s, 45d of each stage 61s, 61d is supplied to the gate terminal of the charge transistor 3s, 3d and to the input of the inverting circuit 45s, 45d of the next stage of the same branch, respectively 2s and 2d.

A charge-transfer transistor 4s, 4d has its drain terminal connected to the drain terminal and its gate terminal connected to the gate terminal of the charge-transfer transistor 3s and of the charge-transfer transistor 3d, respectively, of the last stage. The charge-transfer transistors 4s, 4d moreover have their source terminals connected to the output node 11.

When the phase signal ϕ is low and the phase signal ϕN is high, the boosting capacitor 12s of the first, third, and fifth stages 61s of the first branch 2s, and the boosting capacitor 12d of the second and fourth stages of the second branch 2d are in the charging step. In addition, the boosting capacitor 12d of the first, third and fifth stages 61d of the second branch 2d, and of the second and fourth stages 61s of the first branch 2s are in the charge-transfer step. The driving voltage N1s is thus at $V_{DD}$. In addition, the driving voltages N1d and N2d are at $2V_{DD}$; the driving voltages N2s and N3s are at $3V_{DD}$; the driving voltages N3d and N4d are at $4V_{DD}$; the driving voltages N4s and N5s are at $5V_{DD}$; and the driving voltage N5d is at $6V_{DD}$. When, instead, the phase signal ϕ is high and the phase signal ϕN is low, the situation is reversed, and the driving voltage N1d is at $V_{DD}$; the driving voltages N1s and N2s are at $2V_{DD}$; the driving voltages N2d and N3d are at $3V_{DD}$; the driving voltages N3s and N4s are at $4V_{DD}$; the driving voltages N4d and N5d are at $5V_{DD}$; and the driving voltage N5s is at $6V_{DD}$.

In this case, then, the driving voltages of each branch 2s, 2d are generated in a crosswise manner directly by the opposite branch 2d, 2s. In addition, as in the case of the charge pumps 30 of FIG. 5 and 50 of FIG. 7, no dead times are present between the active pumping steps. The charge pump 60 of FIG. 8 affords the additional advantage of being modular.

Finally, it is clear that numerous modifications and variations may be made to the charge pump described herein, without thereby departing from the scope of the present invention. For example, the number of stages of the multi-stage charge pump of FIG. 8 may range from a minimum of two to a maximum number as desired, according to the desired output voltage.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A charge-pump device, comprising:
   a first driving circuit having a first input and an output;
   a second driving circuit having a first input and an output;
   first and second pumping branches, connected in parallel and having respective control inputs connected to the outputs of the first and second driving circuits, respectively; and,
   first and second auxiliary charge pumps connected to said first and, second pumping branches, respectively, the first auxiliary charge pump having a first output connected to the first input of the second driving circuit, and the second auxiliary charge pump having a first output connected to the first input of the first driving circuit, the first auxiliary charge pump generating a first pumped driving signal for the second driving circuit, and the second auxiliary charge pump generating a second pumped driving signal for the first driving circuit.

2. The charge-pump device according to claim 1 wherein the first and second auxiliary charge pumps have respective control inputs connected respectively to the outputs of said first and second driving circuits, the first driving circuit generating a first driving signal for said first pumping branch and for said first auxiliary charge pump, the second driving circuit generating a second driving signal for said second pumping branch and for said second auxiliary charge pump.

3. The charge-pump device according to claim 1 wherein:
   said first driving circuit comprises a first inverting circuit having a control input, a supply input and a driving output, said driving output of said first inverting circuit being connected to said first pumping branch;
   said second driving circuit comprises a second inverting circuit having a control input, a supply input and a driving output, said driving output of said second inverting circuit being connected to said second pumping branch;
   said first auxiliary pump comprises first and second outputs; said first output of said first auxiliary pump being connected to said control input of said second inverting circuit, and said second output of said first auxiliary pump being connected to said supply input of said second inverting circuit; and
   said second auxiliary pump comprises first and second outputs; said first output of said second auxiliary pump being connected to said control input of said first inverting circuit, and said second output of said second auxiliary pump being connected to said supply input of said first inverting circuit.

4. The charge-pump device according to claim 3 wherein:
   said first pumping branch comprises a first charging transistor, a first charge-transfer transistor, and a first boosting capacitor, said first charging transistor being connected between a supply node and a first intermediate node, said first charge-transfer transistor being connected between said first intermediate node and an output node, and said first boosting capacitor having a first terminal connected to said first intermediate node and a second terminal receiving a first oscillating signal, and wherein said control input of said first inverting circuit is connected to a control terminal of said first charging transistor, and said driving output of said first inverting circuit is connected to a control terminal of said first charge-transfer transistor; and
   said second pumping branch comprises a second charging transistor, a second charge-transfer transistor, and a second boosting capacitor, said second charging transistor being connected between the supply node and a second intermediate node, said second charge-transfer transistor being connected between said second intermediate node and the output node, and said second boosting capacitor having a first terminal connected to said second intermediate node and a second terminal receiving a second oscillating signal, and wherein said control input of said second inverting circuit is connected to a control terminal of said second charging transistor, and said driving output of said second inverting circuit is connected to a control terminal of said second charge-transfer transistor.

5. The charge-pump device according to claim 3 wherein:
   said first auxiliary charge pump comprises a first and a second auxiliary switch, and a first and a second auxiliary capacitor, said first and second auxiliary switches being connected between a supply node and said second output of said first auxiliary charge pump and being connected to each other at said first output of said first auxiliary charge pump, said first auxiliary capacitor having a first terminal connected to said first output of said first auxiliary charge pump and a second terminal receiving a first phase signal, and said second auxiliary capacitor having a first terminal connected to said second output of said first auxiliary charge pump and a second terminal receiving a second phase signal, opposite to said first phase signal; and
   said second auxiliary charge pump comprises third and fourth auxiliary switches, and third and fourth auxiliary capacitors, said third and fourth auxiliary switches being connected between the supply node and said second output of said second auxiliary charge pump and being connected to each other at said first output of said second auxiliary charge pump, said third auxiliary capacitor having a first terminal connected to said first output of said second auxiliary charge pump and a second terminal receiving the first phase signal, and said fourth auxiliary capacitor having a first terminal connected to said second output of said second auxiliary charge pump and a second terminal receiving the second phase signal.

6. The charge-pump device according to claim 5 wherein said first and second auxiliary switches comprise, respectively, a first and a second auxiliary transistor, each having a control input, said control input of said first auxiliary transistor being connected to said control input of said first inverting circuit, and said control input of said second auxiliary transistor being connected to said driving output of said first inverting circuit.

7. The charge-pump device according to claim 3 wherein:
   said first auxiliary charge pump comprises a first auxiliary switch and a first auxiliary capacitor, said first auxiliary switch being connected between said first and said second outputs of the first auxiliary charge pump, said first auxiliary capacitor having a first terminal connected to said second output of the first auxiliary charge pump and a second terminal receiving a first phase signal, said first output of said first auxiliary charge pump being connected to an intermediate node of said second pumping branch; and said second auxiliary charge pump comprises a second auxiliary switch and a second auxiliary capacitor, said second auxiliary switch being connected between said first and said second outputs of the second auxiliary charge pump, said second auxiliary capacitor having a first terminal connected to said second output of the second auxiliary charge pump and a second terminal receiving a second phase signal, opposite to the first phase signal, said first output of said second auxiliary charge pump being connected to an intermediate node of said first pumping branch.

8. The charge-pump device according to claim 7 wherein said first and second auxiliary switches comprise first and second auxiliary transistors, respectively, said first auxiliary transistor having a control input connected to said driving output of said first inverting circuit, and said second auxiliary transistor having a control input connected to said driving output of said second inverting circuit.

9. The charge-pump device according to claim 1 wherein said first pumping branches comprises a first and a second stage cascaded together, each of said stages comprising a charging transistor and a boosting capacitor, said first auxiliary charge pump including an auxiliary charging transistor and an auxiliary boosting capacitor, said auxiliary charging transistor being connected between a supply node and a first intermediate node, said charging transistor of said first stage being connected between said first intermediate node and a second intermediate node, said charging transistor of said second stage being connected between said second intermediate node and a third intermediate node and being connected to an output node, each of said boosting capacitors having a first terminal connected to a respective one of said intermediate nodes and a second terminal receiving an oscillating signal.

10. A method for driving a charge-pump device including a first and a second pumping branch, connected in parallel, said method comprising the steps of:

generating first and second driving signals for said first pumping branch and, respectively, said second pumping branch through a first and, respectively, a second driving circuit;

providing a first and a second auxiliary charge pump;

supplying said first and second driving signals to said first auxiliary charge pump and, respectively, to said second auxiliary charge pump to obtain first and, respectively, second voltage-boosted signals; and supplying said first and said second voltage-boosted signals to said second driving circuit and, respectively, to said first driving circuit.

11. A charge pump, comprising:

a voltage input;

a boosted voltage output;

a first pumping branch having a plurality of first pumping stages cascade connected between the voltage input and the boosted voltage output, each of the first pumping stages having first and second inputs and an output and being configured to boost a voltage level from the first input of the first pumping stage to provide a boosted driving signal at the output of the first pumping stage, the boosted driving signal provided by a last one of the first pumping branches being provided to the boosted voltage output; and a second pumping branch having a plurality of second pumping stages cascade connected in parallel with the first pumping branch between the voltage input and the boosted voltage output, each of the second pumping stages having first and second inputs and an output and being configured to boost a voltage level from the first input of the second pumping stage to provide a boosted driving signal at the output of the second pumping stage, the boosted driving signal provided by a last one of the second pumping branches being provided to the boosted voltage output, wherein each of the second pumping stages provides its boosted driving signal to the second input of a corresponding one of the first pumping stages and each of the first pumping stages provides its boosted driving signal to the second input of a corresponding one of the second pumping stages.

12. The charge pump of claim 11 wherein the first pumping stages alternate 180 degrees in phase from stage to stage, the second pumping stages alternate 180 degrees in phase from stage to stage, and a first one of the first pumping stages is in phase opposition with a first one of the second pumping stages.

* * * * *